(12) United States Patent
Burnside (10) Patent No.: US 10,738,699 B2
(45) Date of Patent: Aug. 11, 2020

(54) AIR-INLET PARTICLE SEPARATOR HAVING A BLEED SURFACE

(71) Applicant: Rolls-Royce North American Technologies Inc., Indianapolis, IN (US)

(72) Inventor: Phillip H. Burnside, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 224 days.

(21) Appl. No.: 15/875,268

(22) Filed: Jan. 19, 2018

(65) Prior Publication Data

US 2019/0226403 A1 Jul. 25, 2019

(51) Int. Cl.

| | | |
|---|---|---|
| *B01D 45/00* | (2006.01) | |
| *F02C 7/052* | (2006.01) | |
| *B01D 45/04* | (2006.01) | |
| *F02C 7/042* | (2006.01) | |
| *B01D 45/08* | (2006.01) | |
| *B64D 33/02* | (2006.01) | |
| *B01D 46/10* | (2006.01) | |

(52) U.S. Cl.
CPC .............. *F02C 7/052* (2013.01); *B01D 45/04* (2013.01); *B01D 45/08* (2013.01); *F02C 7/042* (2013.01); *B01D 46/10* (2013.01); *B64D 33/02* (2013.01); *F05D 2220/32* (2013.01)

(58) Field of Classification Search
CPC .......... F02C 7/052; F02C 7/042; B01D 45/04; F05D 2220/32
See application file for complete search history.

(56) References Cited

U.S. PATENT DOCUMENTS

| | | | |
|---|---|---|---|
| 2,534,138 A | 12/1950 | Marshall | |
| 2,935,158 A | 5/1960 | Braun | |
| 3,319,402 A | 5/1967 | Rlitchie | |
| 3,329,377 A | 7/1967 | Peterson et al. | |
| 3,338,049 A * | 8/1967 | Fernberger | F02C 7/042 |
| | | | 60/39.092 |
| 3,664,612 A | 5/1972 | Skidmore et al. | |
| 3,702,049 A | 11/1972 | Morris, Jr. | |
| 3,998,048 A | 12/1976 | Derue | |
| 4,265,646 A | 5/1981 | Weinstein et al. | |
| 4,389,227 A | 6/1983 | Hobbs | |
| 4,527,387 A | 7/1985 | Lastrina et al. | |
| 4,928,480 A | 5/1990 | Oliver et al. | |

(Continued)

FOREIGN PATENT DOCUMENTS

GB 2270481 A 3/1994

OTHER PUBLICATIONS

Inertial Particle Separator Multiphase Dynamics, Dominic L. Barone, Ph.D. Thesis, University of Virginia, Dec. 2013, 149 pages.

(Continued)

*Primary Examiner* — Dung H Bui
(74) *Attorney, Agent, or Firm* — Barnes & Thornburg LLP (57) ABSTRACT

An air-inlet particle separator includes an outer wall, an inner wall, and a splitter. The splitter cooperates with the outer wall and the inner wall to separate particles entrained in an inlet flow moving through the air-inlet particle separator to provide a clean flow of air for a compressor section of a gas turbine engine.

20 Claims, 4 Drawing Sheets

(56) References Cited

U.S. PATENT DOCUMENTS

| | | |
|---|---|---|
| 5,139,545 A | 8/1992 | Mann |
| 5,339,622 A | 8/1994 | Bardey et al. |
| 6,698,180 B2 | 3/2004 | Snyder |
| 7,296,395 B1 | 11/2007 | Hartman et al. |
| 7,608,122 B2 | 10/2009 | Snyder |
| 7,678,165 B2 | 3/2010 | Tingle et al. |
| 7,708,122 B2 | 5/2010 | Plantan et al. |
| 7,802,433 B2 | 9/2010 | Higgins |
| 7,854,778 B2 | 12/2010 | Groom et al. |
| 7,927,408 B2 | 4/2011 | Sheoran et al. |
| 7,967,554 B2 | 6/2011 | Bremer |
| 8,092,145 B2 | 1/2012 | Martel et al. |
| 8,163,050 B2 | 4/2012 | Belyew |
| 8,727,267 B2 | 5/2014 | Jain et al. |
| 9,027,202 B2 | 5/2015 | Huang |
| 9,046,056 B2 | 6/2015 | Lerg |
| 9,340,988 B2 | 5/2016 | Lyristakis |
| 2003/0196548 A1* | 10/2003 | Hartman ............ B01D 46/0043 95/8 |
| 2005/0098038 A1 | 5/2005 | Blake et al. |
| 2005/0274103 A1 | 12/2005 | Prasad et al. |
| 2009/0139398 A1* | 6/2009 | Sheoran ................ B01D 45/04 95/12 |
| 2012/0131900 A1 | 5/2012 | Kenyon et al. |
| 2013/0160411 A1 | 6/2013 | Mayer et al. |
| 2014/0027538 A1 | 1/2014 | Webster |
| 2015/0030435 A1* | 1/2015 | Howe .................... F02C 7/052 415/121.2 |
| 2015/0198090 A1* | 7/2015 | Howe .................... F02C 7/052 60/39.092 |
| 2016/0177824 A1* | 6/2016 | Ponton .................. F02C 7/052 60/779 |
| 2016/0265434 A1 | 9/2016 | Snyder |
| 2016/0265435 A1* | 9/2016 | Snyder .................. F02C 7/057 |
| 2016/0363051 A1 | 12/2016 | Snyder et al. |
| 2017/0138263 A1* | 5/2017 | Duge .................... B01D 45/04 |
| 2018/0058323 A1* | 3/2018 | Smith, III ................ F02K 3/04 |

OTHER PUBLICATIONS

Intake Ground Vortex Aerodynamics, John Murphy, Ph.D. Thesis, Cranfield University, Dec. 2008, 330 pages.

Inlet Vortex Formation Under Crosswind Conditions, Nathan Rosendo Horvath, MS Thesis, Worcester Polytechnic Institute, Apr. 2013, 146 pages.

A.N. Smith and H. Babinsky; J.L. Fulker, P.R. Ashill, Normal shock wave-turbulent boundary-layer interactions in the presence of streamwise slots and grooves, The Aeronautical Journal, p. 493,Sep. 2002, 8 pages.

USAAMRDL-TR-75-31A, General Electric Company, Integral Engine Inlet Particle Separator vol. 1—Technology Program, Jul. 1975, 109 pages.

* cited by examiner

AIR-INLET PARTICLE SEPARATOR HAVING A BLEED SURFACE

FIELD OF THE DISCLOSURE

The present disclosure relates generally to gas turbine engines, and more specifically to particle separators included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and ignited. Products of the combustion reaction in the combustor are directed into the turbine where work is extracted to drive the compressor and, sometimes, an output shaft. Left-over products of the combustion are exhausted out of the turbine and may provide thrust in some applications.

Air is drawn into the engine through an air inlet and communicated to the compressor via an air-inlet duct. In some operating conditions, particles may be entrained in the air such as dust, sand, or liquid water and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

One method of separating particles from air entering the compressor has been by inertial particle separation. Inertial particle separation uses the inertia of the particles to separate the particles from the air. As the air stream moves through the air-inlet duct, the air moves along a serpentine flow path and enters an engine channel of the air-inlet duct while the particles move along a generally linear travel path and enter a scavenge channel included in the air-inlet duct. In some instances, particles may enter the engine channel rather than the scavenge channel. Particles may deviate from the generally linear travel path due separation of flow from a wall of the air-inlet duct leading to recirculation of the particles and/or other fluid flow phenomenon upstream of the scavenge channel.

SUMMARY

The present disclosure may comprise one or more of the following features and combinations thereof.

An air-inlet particle separator may include an inner wall, an outer wall, and a splitter. The inner wall may be arranged circumferentially about an axis of the air-inlet particle separator. The outer wall may be arranged circumferentially about the inner wall to define an air-inlet passageway adapted to receive a mixture of air and particles suspended in the air and the outer wall formed to include a plurality of apertures that extend through the outer wall to block the mixture of air and particles from forming vortices. The splitter may be located radially between the outer wall and the inner wall. The splitter may be configured to separate the mixture of air and particles into a clean flow substantially free of particles and a dirty flow containing the particles. The splitter and the inner wall may define an engine channel arranged to receive the clean flow. The splitter and the outer wall may define a scavenge channel arranged to receive the dirty flow. The outer wall may be configured to change shape selectively from an operating arrangement to a cleaning arrangement to cause particles attached to the outer wall and particles plugging the plurality of apertures to separate from the outer wall and move into the scavenge channel to clean the outer wall.

In some embodiments, the outer wall may comprise bimetallic materials. The bimetallic materials may be configured to change shape in response to electric energy being applied to the bimetallic materials included in the outer wall.

In some embodiments, the air-inlet particle separator may further include an inflatable bladder. The inflatable bladder may be arranged adjacent the outer wall. The inflatable bladder may be configured to inflate and deflate to change the outer wall between the operating arrangement and the cleaning arrangement.

In some embodiments, the outer wall may include an inflatable bladder and a flexible covering arranged around the inflatable bladder. The flexible covering may be formed to include the plurality of apertures. The inflatable bladder may be configured to inflate and deflate to change the shape of the outer wall between the operating arrangement and the cleaning arrangement. In some embodiments, the flexible covering may include a material reinforced with fibers.

In some embodiments, the splitter may include a first splitter wall and a second splitter wall. The first splitter wall and the second splitter wall may cooperate to define a tip of the splitter. The plurality of apertures may be located downstream of the tip of the splitter.

In some embodiments, the outer wall may be annular. In some embodiments, the outer wall may be configured to change between the operating arrangement and the cleaning arrangement in response to the gas turbine engine starting and stopping.

According to another aspect of the present disclosure, an air-inlet particle separator may include a first wall, a second wall, and a splitter. The second wall may be spaced apart from the first wall to define an air-inlet passageway adapted to receive a mixture of air and particles suspended in the air. The second wall may be formed to include a plurality of apertures that extend through the second wall. The second wall may be deformable selectively. The splitter may be configured to separate the mixture of air and particles into a clean flow substantially free of particles and a dirty flow containing the particles. The splitter may be located between the first wall and the second wall downstream of the air-inlet passageway.

In some embodiments, the second wall may include bimetallic materials. The bimetallic materials may be configured to deform in response to electric energy being applied to the bimetallic materials.

In some embodiments, the air-inlet particle separator may further include an inflatable bladder. The inflatable bladder may be arranged adjacent the second wall. The inflatable bladder may be configured to inflate and deflate to deform the second wall.

In some embodiments, the second wall may include an inflatable bladder and a flexible covering arranged around the inflatable bladder. The flexible covering may be formed to include the plurality of apertures. The inflatable bladder may be configured to inflate and deflate to deform the second wall. In some embodiments, the flexible covering may include material reinforced with fibers.

In some embodiments, the splitter may include a first splitter wall and a second splitter wall that cooperate to define a tip of the splitter. The plurality of apertures may be located downstream of the tip of the splitter.

In some embodiments, the at least a portion of the second wall may be hoop shaped. In some embodiments, the air-inlet particle separator may further include a controller configured to deform the second wall periodically.

According to another aspect of the present disclosure a method may include a number of steps. The method may include providing an inlet flow to an air-inlet particle separator of a gas-turbine engine, the inlet flow including air and particles suspended in the air, and the air-inlet particle separator including a first wall, a second wall spaced apart from the first wall and formed to include apertures therein, and a splitter located between the first wall and the second wall, separating the inlet flow into a dirty flow including substantially all the particles and a clean flow lacking substantially all the particles, directing the clean flow between the splitter and the first wall, directing the dirty flow between the splitter and the second wall, and deforming a portion of the second wall between a first arrangement and a second arrangement to separate particles from the portion of the second wall.

In some embodiments, the portion of the second wall may include at least one of the plurality of apertures. In some embodiments, wherein the deforming step may include applying electric energy to the portion of the second wall. In some embodiments, wherein the deforming step may include varying a pressure of a fluid applied to an inflatable bladder to cause the portion of the second wall to move.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
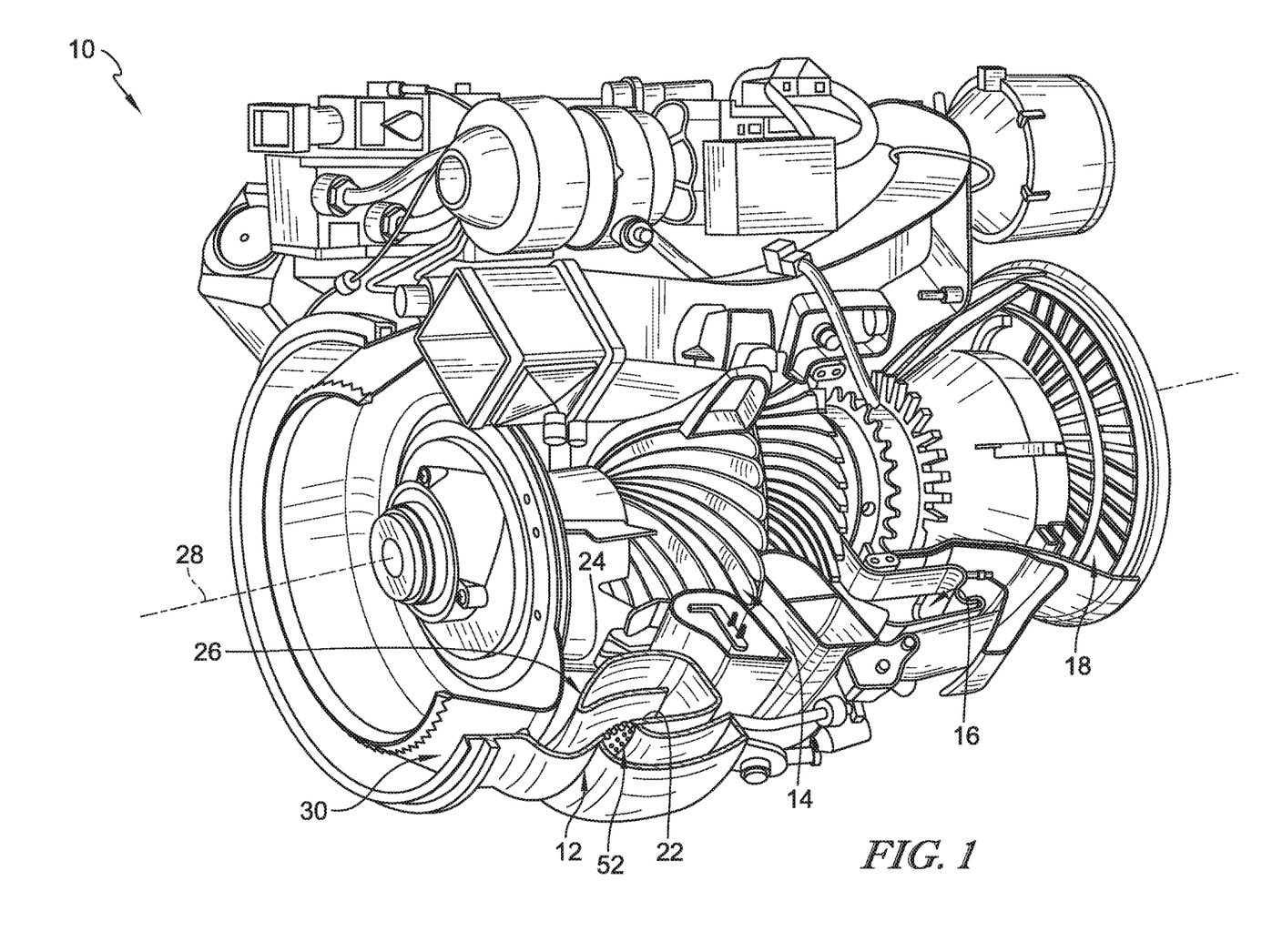
FIG. 1 is a cut-away perspective view of a gas turbine engine having an air-inlet particle separator in accordance with the present disclosure, the air-inlet particle separator adapted to separate an inlet flow into a clean airflow conducted to a compressor of the engine and a dirty airflow conducted to a scavenge of the engine.

A gas turbine engine 10 in accordance with the present disclosure is shown, for example, in FIG. 1. The gas turbine engine 10 includes an air-inlet particle separator 12, a compressor section 14, a combustor section 16, and a turbine section 18. Air is drawn into the gas turbine engine 10 through the air-inlet particle separator 12 prior to admission of the air into the compressor section 14 as suggested in FIGS. 1 and 2. The compressor section 14 compresses air drawn into the gas turbine engine 10 and delivers high-pressure air to the combustor section 16. The combustor section 16 ignites a mixture of the compressed air and fuel. Products of the combustion process are directed into the turbine section 18 where work is extracted to drive the compressor section 14 and a fan, propeller, output shaft, or gearbox.

In some environments, particles such as dirt, sand, or liquid water may be entrained in the air surrounding the gas turbine engine 10 and carried into the air-inlet particle separator 12 of the gas turbine engine 10. The illustrative air-inlet particle separator 12 separates the particles from the air and conducts a clean flow 40 of air substantially free from particles to the compressor section 14 so that damage to the compressor section 14, combustor section 16, and turbine section 18 is minimized. A dirty flow 42 containing the particles is conducted to a scavenge 44 of the engine 10.

Figure 2:
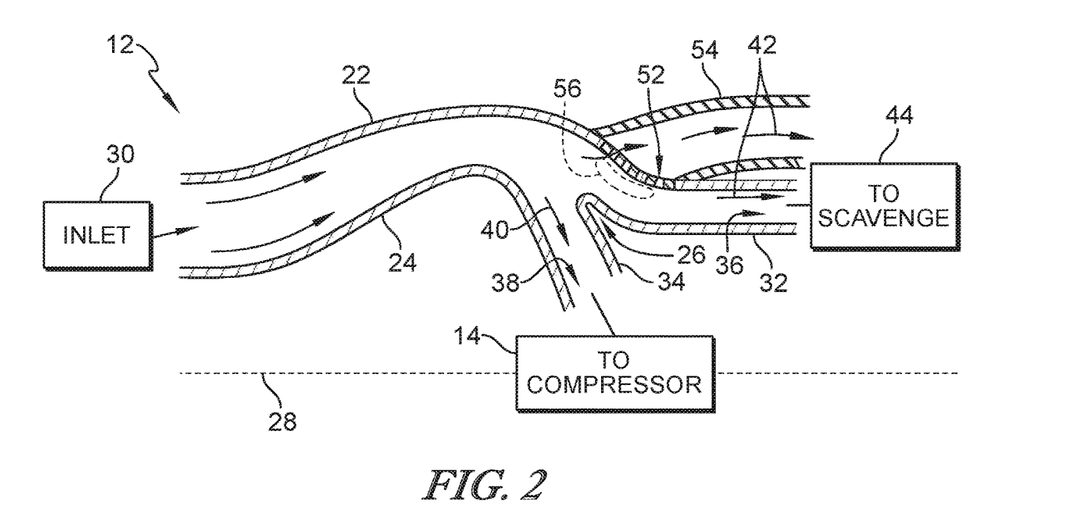
FIG. 2 is a diagrammatic and section view of the air-inlet particle separator included in the gas turbine engine of FIG. 1 showing that the air-inlet particle separator includes a deformable outer wall, an inner wall spaced apart from the outer wall to define an inlet, and a splitter located between the outer wall and the inner wall, and suggesting that the outer wall is deformable and formed to include a plurality of apertures to block the formation of a wall-normal vortex from forming in a flow path of the air-inlet particle separator.

In some particle separators, natural phenomenon such as, for example, boundary layer separation may occur and can cause the airflow in the particle separator to become unsteady as suggested, for example, in area 56 shown in FIG. 2. Unsteady airflow may result in wall-normal vortices being formed and reduce the performance of a particle separator such that less particulate is removed from a flow of air directed into the compressor section of an engine. Designs in accordance with the present disclosure provide a particle separator 12 arranged to block the formation of wall-normal vortices from forming in the particle separator 12.

A wall 22 of the particle separator 12 is formed to include a plurality of apertures 52 (sometimes called bleed holes) arranged to block the formation of wall-normal vortices, for example in area 56 of the particle separator 12, as suggested in FIG. 2. Over time particles may build up on the wall 22 and block the apertures 52 which may reduce the efficiency of the particle separator 12. The wall 22 is configured to change shape from an operating arrangement to a cleaning arrangement to cause particles attached to the wall 22 and particles plugging the plurality of apertures 52 to separate from the wall 22 as suggested in FIGS. 3-5. As a result, the wall 22 and apertures 52 may be cleaned of particles without disassembling the gas turbine engine 10 and/or during operation of the gas turbine engine 10.

The illustrative air-inlet particle separator 12 includes an outer wall 22, an inner wall 24, and a splitter 26 as shown in FIG. 2. The outer wall 22 is spaced apart radially from the inner wall 24 to define an air-inlet passageway 30 configured to receive a flow of air for the gas turbine engine 10. Sometimes the flow of air includes a mixture of air and particles suspended in the air. The splitter 26 is located between the outer wall 22 and the inner wall 24 and configured to separate the mixture of air and particles into the clean flow 40 substantially free of particles and the dirty flow 42 containing the particles. The clean flow 40 is conducted toward the compressor section 14 and the dirty flow 42 is conducted to scavenge 44 and may be conducted back to the environment surrounding the gas turbine engine 10.

The inner wall 24 is annular and arranged circumferentially about an axis 28 of the gas turbine engine 10 as shown in FIGS. 1 and 2. The inner wall 24 is continuous and configured to bend relatively sharply near the splitter 26 to help direct the clean flow 40 toward the compressor section 14.

The outer wall 22 is annular and arranged circumferentially about the inner wall 24 and the axis 28 as shown in FIG. 2. In the illustrative embodiment, the outer wall 22 is continuous except for the plurality of apertures 52.

Figure 3:
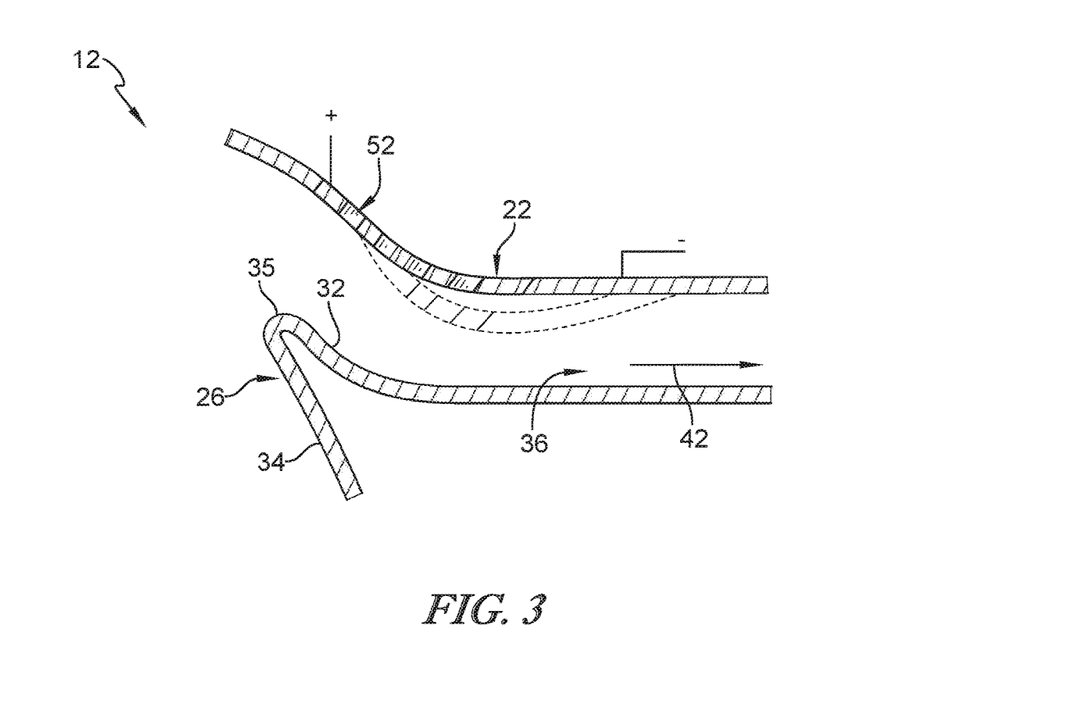
FIG. 3 is a diagrammatic and section view of a portion of the air-inlet particle separator of FIG. 2 suggesting that that the outer wall includes bi-metallic material configured to change shape in response to receiving electric energy to knock off particles that may have built up on the outer wall and in the plurality of apertures.

The splitter 26 is located between the outer wall 22 and the inner wall 24 as shown in FIGS. 2 and 3. The splitter 26 includes an outer splitter wall 32 and an inner splitter wall 34 that define a tip 35 of the splitter 26 at a forward end of the splitter 26 as shown in FIGS. 2 and 3.

The inner splitter wall 34 cooperates with the inner wall 24 to define an engine channel 38 (sometimes called a clean channel) therebetween as shown in FIG. 2. The engine channel 38 is configured to receive the clean flow 40 of air and to direct the clean flow 40 of air into the compressor sections 14 of the gas turbine engine 10.

The outer splitter wall 32 cooperates with the outer wall 22 to define a scavenge channel 36 therebetween as shown in FIG. 2. The scavenge channel 36 is configured to receive and direct the dirty flow 42 toward scavenge 44 as shown in FIG. 2. In some embodiments, the scavenge 44 is configured to direct the dirty flow 42 out of the gas turbine engine 10 into the atmosphere. In other embodiments, the scavenge 44 conducts the dirty flow 42 elsewhere in the gas turbine engine 10 or nacelle.

In some particle separators, a wall-normal vortex forms in the inlet flow, for example, around area 56 as suggested in FIG. 2. The wall-normal vortex may grow from the outer wall 22 toward the inner wall 24 in a region upstream of the splitter 26. In particular, the vortex may form in a region upstream and neighboring an inlet of the scavenge channel 36. The apertures 52 may be formed in the outer wall 22 in locations where the vortices are likely to form. In other embodiments, the vortex may grow from an inner wall toward an outer wall.

Wall-normal vortices may decrease the efficiency of particle separators. For example, the wall-normal vortex may block particles from entering the scavenge channel 36 and cause the blocked particles to enter the engine channel 38. As another example, the wall-normal vortex may draw particles out of the scavenge channel 36 and cause the particles to enter the engine channel 38. Wall-normal vortices may have a greater effect on relatively fine particles (about 25 microns or smaller) than relatively large particles.

In the illustrative embodiment, the outer wall 22 is formed to include the plurality of apertures 52 arranged to extend radially through the outer wall 22 of the air-inlet particle separator 12 as shown in FIGS. 2 and 3. The plurality of apertures 52 reduce or eliminate the formation of wall-normal vortices in the air-inlet particle separator 12.

In some embodiments, the plurality of apertures 52 are located axially aft of and/or adjacent the tip 35 of the splitter 26 as shown in FIG. 2. The apertures 52 are configured to allow portions of the dirty flow 42 to move through the outer wall 22 in either direction to block formation of vortices. For example, portions of the dirty flow 42 may flow from the air-inlet passageway 30 through the apertures 52 into a duct 54. The duct 54 may direct the dirty flow 42 into the scavenge, into the channel 36, or to environment surrounding the engine 10.

The location, number, and size of the apertures 52 may be varied. In the illustrative embodiment, the apertures 52 are spaced apart circumferentially from one another around the axis 28. In some embodiments, the outer wall 22 may include only a single aperture 52. In some embodiments, the apertures 52 are angled relative to the outer wall 22 to direct the flow of air through the apertures 52. In the illustrative embodiment, the apertures 52 are circular. One or more apertures 52 may be formed in the outer wall 22 and may be spaced apart circumferentially from one another. In another example, the spacing between the apertures 52 may be generally equal or varied between neighboring apertures 52.

At least a portion of the outer wall 22 is configured to change shape from the operating arrangement to the cleaning arrangement as suggested in FIG. 3. In the operating arrangement, the outer wall 22 is configured to cooperate with the splitter 26 to separate particles from the air and conduct the dirty flow to scavenge as suggested in FIG. 2. In the cleaning arrangement, the outer wall 22 is deformed and a shape of the outer wall changes 22 relative to the operating arrangement.

Moving between the operating arrangement and the cleaning arrangement causes particles attached to the outer wall 22 and particles plugging the plurality of apertures 52 to separate from the outer wall 22 and move into the dirty flowpath so as to clean the outer wall 22. In the illustrative embodiment, the outer wall 22 comprises bi-metallic materials configured to change shape in response to electric energy being applied to the outer wall 22 as suggested in FIG. 3. As shown a positive and negative charge are coupled to the outer wall 22 and electric energy is provided to the outer wall 22 to cause the outer wall 22 to change shape. In other embodiments, the outer wall 22 comprises piezoelectric materials configured to change shape in response to electric energy being applied to the outer wall 22 as suggested in FIG. 3.

The operating arrangement is shown in solid lines and the cleaning arrangement is indicated by dotted lines in FIG. 3. In the illustrative embodiment, the outer wall 22 moves radially inward to assume the cleaning arrangement. In other embodiments, the outer wall 22 may move radially outward or any combination of movements to assume the cleaning arrangement. The outer wall 22 may be flexible to change shape. In some embodiments, the outer wall 22 is rigid and an internal or external force is applied to the outer wall 22 to change its shape.

In some embodiments, the outer wall 22 is configured to change shape in response to the gas turbine engine 10 starting. In some embodiments, the outer wall 22 is configured to change shape in response to the gas turbine engine 10 stopping/shutting down. In some embodiments, the outer wall 22 is configured to change shape periodically during operation of the gas turbine engine 10. In some embodiments, the outer wall 22 is configured to change shape in response to the gas turbine engine 10 operating. In one example, starting and operating the gas turbine engine 10 provides electric energy to the outer wall 22 to change the outer wall from the cleaning arrangement to the operating arrangement and shutting down the gas turbine engine 10 removes the electric energy such that the outer wall changes shape to the cleaning arrangement to separate particles from the outer wall 22.

In the illustrative embodiment, the air-inlet particle separator 12 further includes the duct 54 arranged radially outwardly of the outer wall 22 and arranged around the plurality of apertures 52 as shown in FIG. 2. In some embodiments, the duct 54 is fluidly connected to scavenge 44. In some embodiments, the duct 54 is self-enclosed. In some embodiments, the duct 54 is in fluid communication with the environment surrounding the gas turbine engine 10.

The illustrative air-inlet particle separator 12 comprises an inward turning particle separator 12 as shown in FIG. 2. In other embodiments, the air-inlet particle separator 12 comprises an inward turning particle separator, outward turning particle separator, linear type particle separator, dual path type particle separator, multi-path particle separators, or any combination thereof. In some separators such as, for example, outward turning separators, the inner wall 24 or any other suitable surface may be formed to include the plurality of apertures 52.

A method related to the particle separator 12 may include a number of steps. The method may include providing the inlet flow to the air-inlet particle separator 12 of the gas-turbine engine 10. The inlet flow may include air and particles suspended in the air. The air-inlet particle separator 12 includes a first wall, a second wall spaced apart from the first wall and formed to include apertures therein, and a splitter located between the first wall and the second wall.

The method may include separating the inlet flow into a dirty flow including substantially all the particles and a clean flow lacking substantially all the particles. The method may include directing the clean flow between the splitter and the first wall. The method may include directing the dirty flow between the splitter and the second wall. The method may include deforming a portion of the second wall between a first arrangement and a second arrangement to separate any particles from the portion of the second wall. The portion of the second wall may include at least one of the plurality of apertures. The deforming step may include applying electric energy to the portion of the second wall. The deforming step may include varying a pressure of a fluid applied to an inflatable bladder to cause the portion of the second wall to move.

Figure 4:
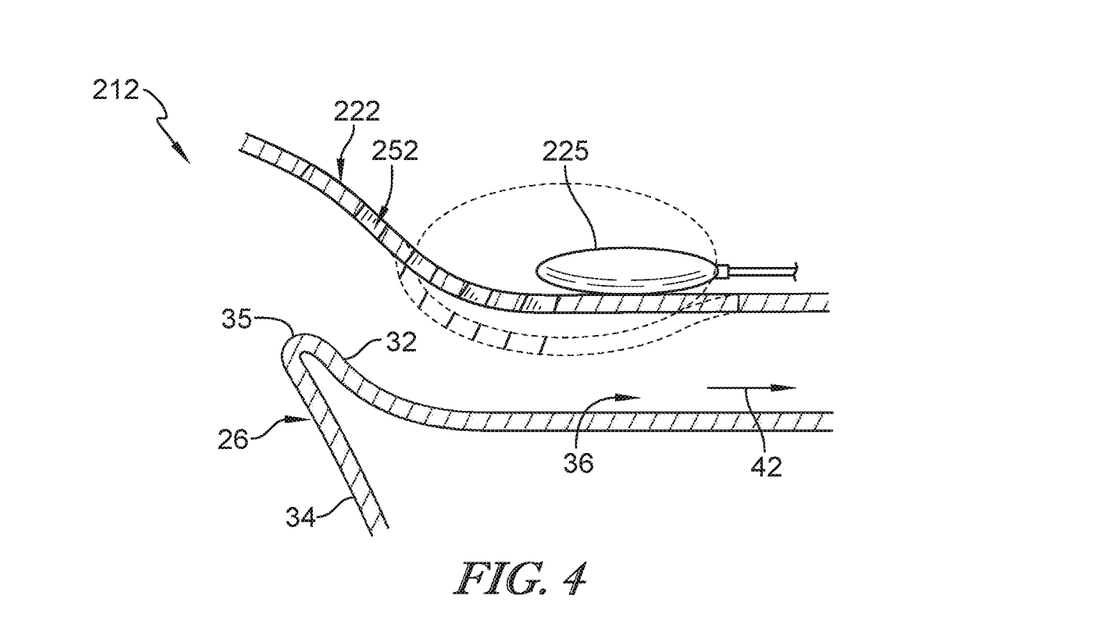
FIG. 4 is a diagrammatic and section view of another embodiment of an air-inlet particle separator adapted for use with the gas turbine engine of FIG. 1 showing that the particle separator includes an inflatable bladder configured to inflate and deflate to change the shape of the deformable outer wall to cause particles built up on the outer wall and in the apertures to separate from the outer wall.

Another embodiment of an air-inlet particle separator 212 in accordance with the present disclosure is shown in FIG. 4. The air-inlet particle separator 212 is substantially similar to the air-inlet particle separator 12 shown in FIGS. 1-3 and described herein. Accordingly, similar reference numbers in the 200 series indicate features that are common between the air-inlet particle separator 12 and the air-inlet particle separator 212. The description of the air-inlet particle separator 12 is incorporated by reference to apply to the air-inlet particle separator 212, except in instances when it conflicts with the specific description and the drawings of the air-inlet particle separator 212.

The air-inlet particle separator 212 includes an outer wall 222, the inner wall 24, the splitter 26, and an inflatable bladder 225 as shown in FIG. 4. The outer wall 222 comprises flexible material. In the illustrative embodiment, the outer wall 222 comprises rubber. In other embodiments, the outer wall 222 comprises metallic materials. In some embodiments, the outer wall 222 comprises material reinforced with fibers. The outer wall 222 may comprise latex material.

The inflatable bladder 225 is located adjacent the outer wall 222 and is configured to inflate and deflate to change the shape of outer wall 222 between the operating arrangement and the cleaning arrangement as suggested in FIG. 4. In the illustrative embodiment, the outer wall 222 assumes the operating arrangement by default and inflation of the inflatable bladder 225 moves the outer wall 222 to the cleaning arrangement. In other embodiments, the outer wall 222 assumes the cleaning arrangement by default and inflation of the inflatable bladder 225 moves the outer wall 222 to the operating arrangement.

The inflatable bladder 225 is located radially outward of the outer wall 222 as shown in FIG. 4. In other embodiments, the inflatable bladder 225 may be located radially inward of the outer wall 222.

Figure 5:
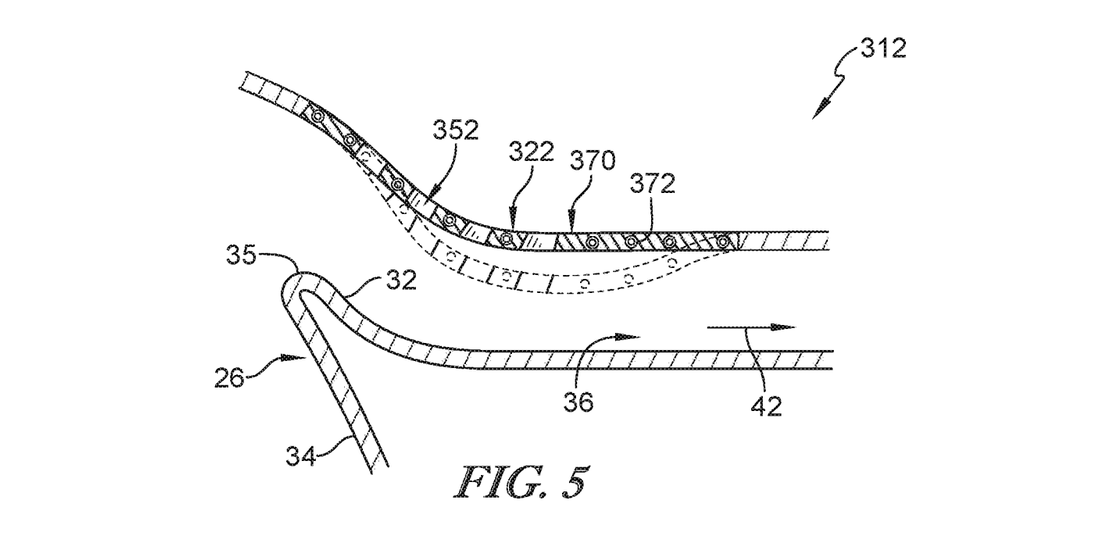
FIG. 5 is a diagrammatic and section view of another embodiment of an air-inlet particle separator adapted for use with the gas turbine engine of FIG. 1 showing that the outer wall of the particle separator includes a flexible covering and an inflatable bladder located within the covering and configured to inflate and deflate to change the shape of the outer wall to cause particles built up on the outer wall and in the apertures to separate from the outer wall.

Another embodiment of an air-inlet particle separator 312 in accordance with the present disclosure is shown in FIG. 5. The air-inlet particle separator 312 is substantially similar to the air-inlet particle separator 12 shown in FIGS. 1-3 and described herein. Accordingly, similar reference numbers in the 300 series indicate features that are common between the air-inlet particle separator 12 and the air-inlet particle separator 312. The description of the air-inlet particle separator 12 is incorporated by reference to apply to the air-inlet particle separator 312, except in instances when it conflicts with the specific description and the drawings of the air-inlet particle separator 312.

The air-inlet particle separator 312 includes an outer wall 322, the inner wall 24, and the splitter 26 as shown in FIG. 4. The outer wall 322 comprises an inflatable bladder 372 and a flexible covering 370 arranged around the inflatable bladder 372. In the illustrative embodiment, the flexible covering 370 comprises rubber. In other embodiments, the outer wall 222 comprises metallic materials. The flexible covering 370 is formed to include a plurality of apertures 252 that extend through the flexible covering 370. In some embodiments, the flexible covering 370 comprises material reinforced with fibers. The flexible covering 370 may comprise latex material.

The inflatable bladder 372 is relatively long and thin and extends circumferentially about the axis 28. In the some embodiments, the outer wall 322 includes a plurality of circumferentially extending inflatable bladders 372 spaced apart axially from one another. In the some embodiments, the outer wall 322 includes a plurality of axially extending inflatable bladders 372 spaced apart circumferentially from one another. In the some embodiments, the inflatable bladder 372 is spiral shaped. In the some embodiments, the inflatable bladder 372 turns over itself so that at least portions of a single bladder 372 extend next to one another.

Figure 6:
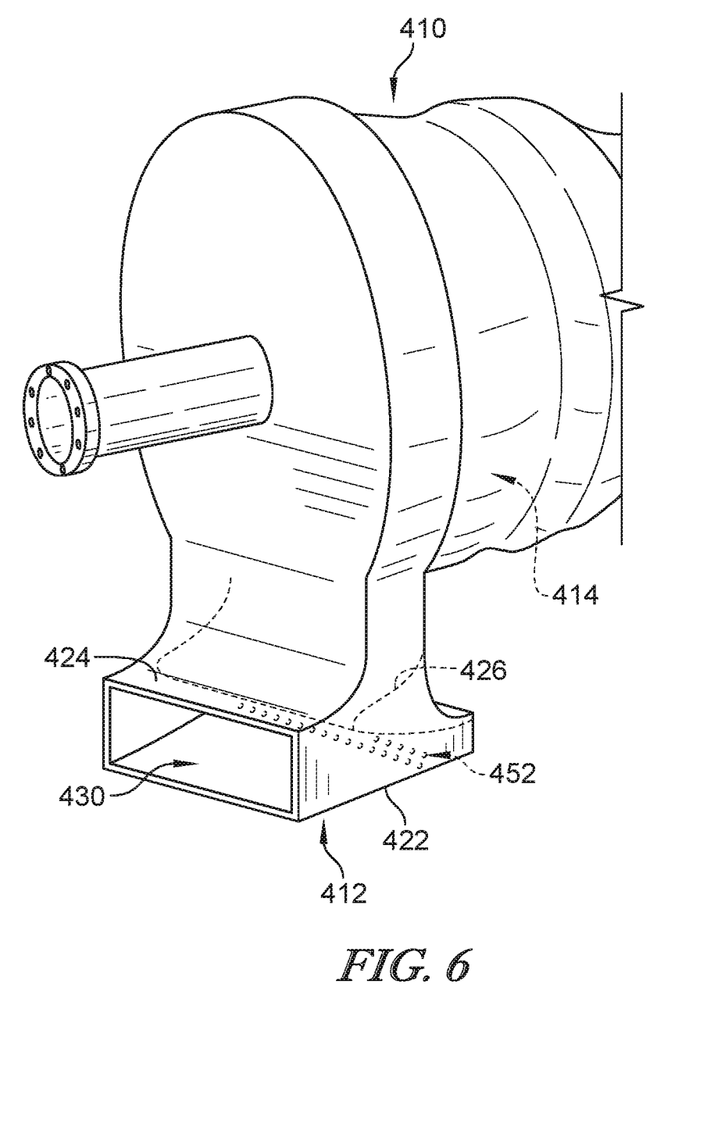
FIG. 6 is a perspective view of another embodiment of a scoop style air-inlet particle separator in accordance with the present disclosure adapted for use with a gas turbine engine, the air-inlet particle separator including a wall formed to include a plurality of apertures and configured to deform to cause particles built up on the wall and in the apertures to separate from the wall.

Another embodiment of an air-inlet particle separator 412 in accordance with the present disclosure is shown in FIG. 6. The air-inlet particle separator 412 is substantially similar to the air-inlet particle separator 12 shown in FIGS. 1-3 and described herein. Accordingly, similar reference numbers in the 400 series indicate features that are common between the air-inlet particle separator 12 and the air-inlet particle separator 412. The description of the air-inlet particle separator 12 is incorporated by reference to apply to the air-inlet particle separator 412, except in instances when it conflicts with the specific description and the drawings of the air-inlet particle separator 412.

The air-inlet particle separator 412 is configured for use with engine 410 as shown in FIG. 6. The air-inlet particle separator 412 is a scoop type particle separator. The air-inlet particle separator 412 includes an outer wall 422 formed to include a plurality of apertures 452, an inner wall 424 spaced apart from the outer wall 422, and a splitter 426 located between the outer wall 422 and the inner wall 424. The outer wall 422 is deformable selectively and configured to change shape between the operating arrangement and the cleaning arrangement to separate any particles from the outer wall 422. The air-inlet particle separator 412 has the scoop shape design and feeds air into an annular inlet into the engine 410.

The separation of particles from the inlet flow for applications such as turboshaft, turboprop, and turbofan gas turbine engines may improve the life of the engine. Sand ingestion may cause erosion of compressor blades and may melt in the combustor and turbine components blocking cooling flow passages. Large sand particles (greater than 50 microns) may be separated well by inertial particle separators. However, fine particles (less than 25 microns) may be difficult to remove from the inlet flow.

A wall-normal vortex may develop in inlet particle separators. Such vortexes may be unsteady in nature and may contribute to the difficulties encountered removing both large and small particles. Mitigating or elimination of the vortex in a particle separator may enhance the overall sand separation efficiency of a class of inertial particle separators.

One feature of the present disclosure may include a wall surface formed as part of the flow path of the particle separator in a region where the wall-normal vortex can form. In some embodiments, open areas in the wall (such as, for example, holes, slots, etc.) of size and distribution reduce or eliminate vortex formation and avoid particle bounce that would reduce particle separation. In some embodiments, additional scavenge flow may be used to remove particles from the cavity. In some embodiments, the wall surface is on the scavenge side of the flow path opposite the splitter feature and opposite the clean leg of the particle separator.

In some embodiments, the wall communicates with a scavenge duct collection system. The anti-wall-normal vortex features may be used in dual path type particle separators, inward turning type separators, outward turning type separators, linear type separators, and any other suitable alternative type separator. The holes formed in the wall may be shaped to reduce the presence of surfaces from which particulate bounce would cause them to enter into the clean engine flow.

Some particle separators have an inlet shape that cause flow separation in the particle track channel. This may cause particles to come back out of the separator and flow into the engine. The flow separation may be reduced by including a bleed surface in the particle separator to collapse the vortices that form in the particle separation channel. The particles may eventually plug the bleed holes.

The present disclosure provides means for knocking the particles off the bleed holes and particle separator wall. In some embodiments, a bladder type surface may be used to knock the particles off the bleed surface, for example, at engine shut down. In some embodiments, the bleed surface may comprise a bi-metallic sheet that, when current is passed through, causes the sheet to change shape to knock off the particles and buildup. With a flexible surface, the vortices may be eliminated and self-cleaning.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet particle separator for use with a gas turbine engine, the air-inlet particle separator comprising
 an inner wall arranged circumferentially about an axis of the air-inlet particle separator,
 an outer wall arranged circumferentially about the inner wall to define an air-inlet passageway adapted to receive a mixture of air and particles suspended in the air and the outer wall formed to include a plurality of apertures that extend through the outer wall to block the mixture of air and particles from forming vortices, and
 a splitter located radially between the outer wall and the inner wall and configured to separate the mixture of air and particles into a clean flow substantially free of particles and a dirty flow containing the particles, the splitter and the inner wall define an engine channel arranged to receive the clean flow, and the splitter and the outer wall define a scavenge channel arranged to receive the dirty flow,
 wherein the outer wall is configured to change shape selectively from an operating arrangement having a first contour to a cleaning arrangement having a second contour to cause particles attached to the outer wall and particles plugging the plurality of apertures to separate from the outer wall and move into the scavenge channel to clean the outer wall, and
 wherein the first contour is different than the second contour.

2. The air-inlet particle separator of claim 1, wherein the outer wall comprises bimetallic materials configured to change shape in response to electric energy being applied to the bimetallic materials included in the outer wall.

3. The air-inlet particle separator of claim 1, further comprising an inflatable bladder arranged adjacent the outer wall and configured to inflate and deflate to change the outer wall between the operating arrangement and the cleaning arrangement.

4. The air-inlet particle separator of claim 1, wherein the outer wall includes an inflatable bladder and a flexible covering arranged around the inflatable bladder, the flexible covering is formed to include the plurality of apertures, and the inflatable bladder is configured to inflate and deflate to change the shape of the outer wall between the operating arrangement and the cleaning arrangement.

5. The air-inlet particle separator of claim 4, wherein the flexible covering comprises material reinforced with fibers.

6. The air-inlet particle separator of claim 1, wherein the splitter includes a first splitter wall and a second splitter wall that cooperate to define a tip of the splitter and the plurality of apertures are located downstream of the tip of the splitter.

7. The air-inlet particle separator of claim 1, wherein the outer wall is annular.

8. The air-inlet particle separator of claim 1, wherein the outer wall is configured to change between the operating arrangement and the cleaning arrangement in response to the gas turbine engine starting and stopping.

9. An air-inlet particle separator comprising
 a first wall,
 a second wall spaced apart from the first wall to define an air-inlet passageway adapted to receive a mixture of air and particles suspended in the air, the second wall formed to include a plurality of apertures that extend through the second wall, and the second wall being deformable selectively between a first arrangement and a second arrangement, the first arrangement being different than the second arrangement, a splitter configured to separate the mixture of air and particles into a clean flow substantially free of particles and a dirty flow containing the particles and the splitter located between the first wall and the second wall downstream of the air-inlet passageway, and a controller configured to deform the second wall between the first arrangement and the second arrangement.

10. The air-inlet particle separator of claim 9, wherein the second wall comprises bimetallic materials configured to deform in response to electric energy being applied to the bimetallic materials.

11. The air-inlet particle separator of claim 9, further comprising an inflatable bladder arranged adjacent the second wall and configured to inflate and deflate to deform the second wall.

12. The air-inlet particle separator of claim 9, wherein the second wall includes an inflatable bladder and a flexible covering arranged around the inflatable bladder, the flexible covering is formed to include the plurality of apertures, and the inflatable bladder is configured to inflate and deflate to deform the second wall.

13. The air-inlet particle separator of claim 12, wherein the flexible covering includes material reinforced with fibers.

14. The air-inlet particle separator of claim 9, wherein the splitter includes a first splitter wall and a second splitter wall that cooperate to define a tip of the splitter and the plurality of apertures are located downstream of the tip of the splitter.

15. The air-inlet particle separator of claim 9, wherein the at least a portion of the second wall is hoop shaped.

16. The air-inlet particle separator of claim 9, wherein the controller is configured to deform the second wall periodically.

17. A method comprising providing an inlet flow to an air-inlet particle separator of a gas-turbine engine, the inlet flow including air and particles suspended in the air, and the air-inlet particle separator including a first wall, a second wall spaced apart from the first wall and formed to include apertures therein, and a splitter located between the first wall and the second wall, separating the inlet flow into a dirty flow including substantially all the particles and a clean flow lacking substantially all the particles, directing the clean flow between the splitter and the first wall, directing the dirty flow between the splitter and the second wall, and deforming selectively a portion of the second wall between a first arrangement having a first contour and a second arrangement having a second contour to separate particles from the portion of the second wall, the first contour being different than the second contour.

18. The method of claim 17, wherein the portion of the second wall includes at least one of the plurality of apertures.

19. The method of claim 17, wherein the deforming step includes applying electric energy to the portion of the second wall.

20. The method of claim 17, wherein the deforming step includes varying a pressure of a fluid applied to an inflatable bladder to cause the portion of the second wall to move.

* * * * *